US008493616B2

(12) United States Patent
Burke et al.

(10) Patent No.: US 8,493,616 B2
(45) **Date of Patent: *Jul. 23, 2013**

(54) METHOD FOR IDENTIFYING A MEDIA TYPE AND SELECTING A PRINT MODE BASED ON THE MEDIA TYPE

(75) Inventors: Gregory M. Burke, San Diego, CA (US); Del R. Doty, Carlsbad, CA (US)

(73) Assignee: Eastman Kodak Company, Rochester, NY (US)

( * ) Notice: Subject to any disclaimer, the term of this patent is extended or adjusted under 35 U.S.C. 154(b) by 431 days.

This patent is subject to a terminal disclaimer.

(21) Appl. No.: 12/604,447

(22) Filed: Oct. 23, 2009

(65) Prior Publication Data

US 2011/0096342 A1 Apr. 28, 2011

(51) Int. Cl.
*H04N 1/60* (2006.01)

(52) U.S. Cl.
USPC ............... 358/1.9; 358/1.4; 358/1.6; 358/1.7; 358/1.8; 358/1.12; 358/1.13; 358/1.15; 358/1.16; 358/1.18; 358/406; 358/443; 358/497; 358/524; 358/530; 347/16; 347/19; 347/40; 347/106; 347/262; 347/264

(58) Field of Classification Search
None
See application file for complete search history.

(56) References Cited

U.S. PATENT DOCUMENTS 4,989,973 A * 2/1991 Noso et al. ................ 356/239.8
5,477,326 A * 12/1995 Dosmann ...................... 356/406
6,079,807 A * 6/2000 Lindstrom et al. ............. 347/16
6,838,687 B2 * 1/2005 Tullis et al. .............. 250/559.07
6,924,911 B1 * 8/2005 Ford et al. ...................... 358/506
6,960,777 B2 11/2005 Soar
7,015,474 B2 * 3/2006 Martenson ................. 250/341.8
7,120,272 B2 10/2006 Guiguizian
2006/0044342 A1 * 3/2006 Tajika et al. .................... 347/19
2006/0044577 A1 * 3/2006 Weast et al. .................... 358/1.9
2009/0009827 A1 * 1/2009 Tamai et al. .................. 358/497
2009/0231403 A1 9/2009 Shi et al.
2011/0096117 A1 * 4/2011 Burke et al. .................... 347/16
2011/0096118 A1 * 4/2011 Burke et al. .................... 347/19
2012/0001977 A1 * 1/2012 Burke ............................. 347/19
2012/0001978 A1 * 1/2012 Burke ............................. 347/19

OTHER PUBLICATIONS

T. D. Pawlik, "Media Identification System with Moving Optoelectronic Device", U.S. Appl. No. 12/332,670, filed Dec. 11, 2008.

* cited by examiner

*Primary Examiner* — Miya J Cato
(74) *Attorney, Agent, or Firm* — Peyton C. Watkins

(57) ABSTRACT

A method for printing an image, the method includes the steps of defining a media support surface; advancing a print medium onto the support surface; emitting light from a first side of the print medium toward the defined surface; moving a sensor on a second side of the print medium along a scan direction; monitoring the position of the sensor as it moves along the scan direction; sensing the light on the second side of the print medium which is opposite the first side as the light passes through the print medium to a sensor; providing memory for storing patterns representing particular media types; providing a processor for comparing signals from the sensor to patterns stored in the memory in order to identify media type; identifying the print medium type; selecting a print mode based on the identified print medium type; processing an image according to the selected print mode; and printing the image on the print medium.

13 Claims, 17 Drawing Sheets

METHOD FOR IDENTIFYING A MEDIA TYPE AND SELECTING A PRINT MODE BASED ON THE MEDIA TYPE

CROSS REFERENCE TO RELATED APPLICATIONS

Reference is made to commonly assigned U.S. patent application Ser. No. 12/604,428 (now published as 2011/0096118) filed Oct. 23, 2009 by Greg M. Burke, entitled "An Inkjet Printer for Detecting the Type of Print Media", and commonly assigned U.S. patent application Ser. No. 12/604,434 (now published as 2011/0096117) filed Oct. 23, 2009 by Greg M. Burke, entitled "A Method for Detecting Media Type".

FIELD OF THE INVENTION

The present invention generally relates to digital printing and more particularly to a method for printing an image.

BACKGROUND OF THE INVENTION

In a carriage printer, such as an inkjet carriage printer, a printhead is mounted in a carriage that is moved back and forth across the region of printing. To print an image on a sheet of paper or other print medium, the medium is advanced a given nominal distance along a media advance direction and then stopped. Medium advance is typically done by a roller and the nominal distance is typically monitored indirectly by a rotary encoder. While the medium is stopped and supported on a platen, the printhead carriage is moved in a direction that is substantially perpendicular to the media advance direction as marks are controllably made by marking elements on the medium—for example by ejecting drops from an inkjet printhead. Position of the carriage and the printhead relative to the print medium is precisely monitored directly, typically using a linear encoder. After the carriage has printed a swath of the image while traversing the print medium, the medium is advanced, the carriage direction of motion is reversed, and the image is formed swath by swath.

In order to produce high quality images, it is helpful to provide information to the printer controller electronics regarding the printing side of the recording medium, which can include whether it is a glossy or matte-finish paper. Such information can be used to select a print mode that will provide an optimal amount of ink in an optimal number of printing passes in order to provide a high quality image on the identified media type. It is well-known to provide identifying marks or indicia, such as a bar code, on a non-printing side of the recording medium to distinguish different types of recording media. It is also well known to use a sensor in the printer to scan the indicia and thereby identify the recording medium and provide that information to the printer control electronics. U.S. Pat. No. 7,120,272, for example includes a sensor that makes sequential spatial measurements of a moving media that contains repeated indicia to determine a repeat frequency and repeat distance of the indicia. The repeat distance is then compared against known values to determine the type of media present.

Co-pending US Patent Application Publication 20090231403 discloses the use of a backside media sensor to read a manufacturer's code for identifying media type. In this approach light from a light source is reflected from the backside of the media and received in a photosensor while the print media is being advanced past the photosensor. A source of unreliability in interpreting the signals is that media can slip during advance past the photosensor.

Co-pending U.S. patent application Ser. No. 12/332,670 discloses reflecting light from a surface which reflected light is eventually sensed by a sensor. In this system, one of the optical components is mounted to a movable device, but the system is entirely dependent on reflected light for operability. As in US Patent Application Publication 20090231403 described above, in order to detect a manufacturer's code for identifying media type, the light is reflected from the backside of the media. Such an approach is compatible with media travel paths in which the backside of the media is viewable. However, this is difficult in some other types of media travel paths, especially where the printing side of the media faces outward away from the stack of media throughout the entire travel path.

Identification of media type by using transmitted light to detect a manufacturer's code, such as a bar code, has been disclosed in US Patent Application Publication 20060044577. In this application, the media is advanced past a transmissive sensor assembly including a light source and a transmissive optical sensor. As in co-pending US Patent Application Publication 20090231403, a source of unreliability in interpreting the signals is that media can slip during advance past the optical sensor.

Other disclosed approaches use both reflection and transmission of light simultaneously in the same printer to detect the media type. For example, U.S. Pat. No. 6,960,777 B2 positions a first light source on one side of the media and a second light source on the opposite side of the media with a sensor also positioned on the second side. The sensor receives light transmitted through the media from the first light source, and reflected light from the second light source. A ratio of the received reflected and transmitted light is then used to determine the media type.

Another prior art system, U.S. Pat. No. 7,015,474 B2, also uses both reflection and transmission of light simultaneously. This system positions a light source and a first sensor on a first side of the media, and a second sensor is positioned on the second side. The first sensor receives reflected light and the second sensor receives transmitted light both of which are used to determine a characteristic of the media.

Although these prior art systems are satisfactory, they include drawbacks. For example, using a ratio of reflected light to transmitted light includes the drawback of not compensating for the degradation of devices over time which will cause the ratio to deviate from expected results. In addition, reflected light may not be suitable at all since, in certain applications, the desired surface from which the light is to be reflected is not conducive to reflection due to the configuration of the paper path and the like. Furthermore, systems which rely on moving the media past a sensor in order to read a manufacturer's code can be adversely affected in detection of sizes or distances between features of a manufacture's code if the media slips relative to the roller whose rotation is monitored, for example, by a rotary encoder. In other words, the position of the media is only indirectly monitored. Although the position of the roller can be well known, the position of the media can vary in unexpected ways relative to the roller.

The present invention overcomes these drawbacks by collectively using a movable component, whose position relative to the print medium is directly monitored, as the component to which one of the optical system devices may be mounted and by using primarily or entirely non-reflected transmitted light.

SUMMARY OF THE INVENTION

The present invention is directed to overcoming one or more of the problems set forth above. Briefly summarized, according to one aspect of the invention, the invention resides in a method for printing an image, the method comprising the steps of defining a media support surface; advancing a print medium onto the support surface; emitting light from a first side of the print medium toward the defined surface; moving a sensor on a second side of the print medium along a scan direction; monitoring the position of the sensor as it moves along the scan direction; sensing the light on the second side of the print medium which is opposite the first side as the light passes through the print medium to a sensor; providing memory for storing patterns representing particular media types; providing a processor for comparing signals from the sensor to patterns stored in the memory in order to identify media type; identifying the print medium type; selecting a print mode based on the identified print medium type; processing an image according to the selected print mode; and printing the image on the print medium.

These and other objects, features, and advantages of the present invention will become apparent to those skilled in the art upon a reading of the following detailed description when taken in conjunction with the drawings wherein there is shown and described an illustrative embodiment of the invention.

Advantageous Effect of the Invention

The present invention has the advantage of using only transmission as the means of detecting media type and of using a movable component, whose position relative to the print medium is directly monitored, as the component to which one of the optical system devices may be attached. The present invention is compatible with media path types (such as L-shaped media paths) in which the printing side of the media faces outward throughout the media path. Embodiments of the present invention are further advantaged by shielding the transmissive light sources from ink mist in an inkjet printer.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
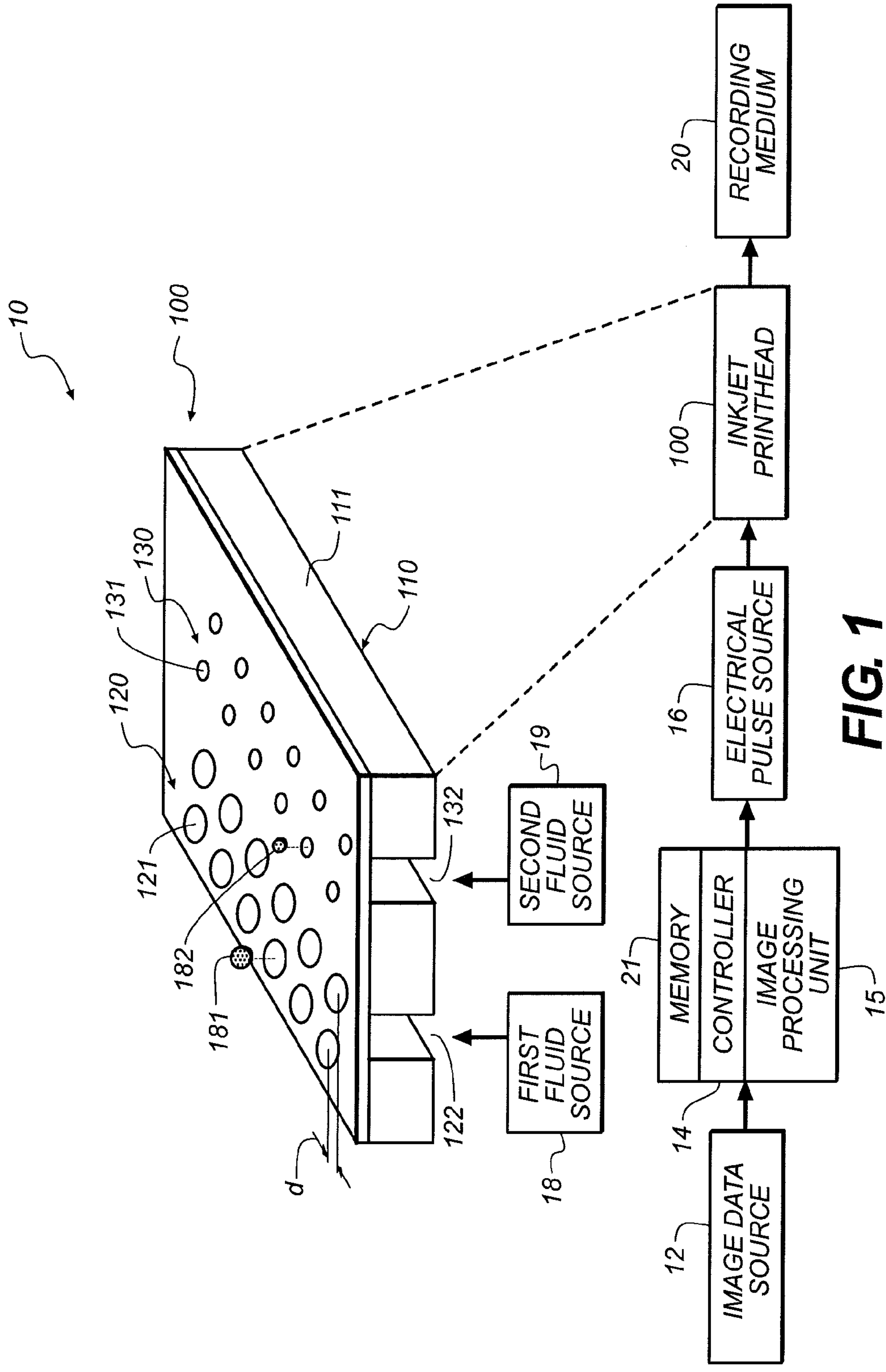
FIG. 1 is a block diagram with an exploded view of an inkjet printhead of the present invention.

Referring to FIG. 1, a schematic representation of an inkjet printer system 10 is shown, for its usefulness with the present invention and is fully described in U.S. Pat. No. 7,350,902, and is incorporated by reference herein in its entirety. Inkjet printer system 10 includes an image data source 12, which provides data signals that are interpreted by a controller 14 as being commands to eject drops. Controller 14 includes an image processing unit 15 for rendering images for printing, and outputs signals to an electrical pulse source 16 of electrical energy pulses that are inputted to an inkjet printhead 100, which includes at least one inkjet printhead die 110. The controller 14 also includes identification processing for comparing an identified type of media to stored media types in memory 21, as will be discussed in detail hereinbelow.

In the example shown in FIG. 1, there are two nozzle arrays 120 and 130 that are each disposed along a nozzle array direction 254. Nozzles 121 in the first nozzle array 120 have a larger opening area than nozzles 131 in the second nozzle array 130. In this example, each of the two nozzle arrays has two staggered rows of nozzles, each row having a nozzle density of 600 per inch. The effective nozzle density then in each array is 1200 per inch (i.e. d=1/1200 inch in FIG. 1). If pixels on the recording medium 20 were sequentially numbered along the paper advance direction, the nozzles from one row of an array would print the odd numbered pixels, while the nozzles from the other row of the array would print the even numbered pixels.

In fluid communication with each nozzle array is a corresponding ink delivery pathway. Ink delivery pathway 122 is in fluid communication with the first nozzle array 120, and ink delivery pathway 132 is in fluid communication with the second nozzle array 130. Portions of ink delivery pathways 122 and 132 are shown in FIG. 1 as openings through printhead die substrate 111. One or more inkjet printhead die 110 will be included in inkjet printhead 100, but for greater clarity only one inkjet printhead die 110 is shown in FIG. 1. The printhead die are arranged on a mounting support member as discussed below relative to FIG. 2. In FIG. 1, first fluid source 18 supplies ink to first nozzle array 120 via ink delivery pathway 122, and second fluid source 19 supplies ink to second nozzle array 130 via ink delivery pathway 132. Although distinct fluid sources 18 and 19 are shown, in some applications it may be beneficial to have a single fluid source supplying ink to both the first nozzle array 120 and the second nozzle array 130 via ink delivery pathways 122 and 132, respectively. Also, in some embodiments, fewer than two or more than two nozzle arrays can be included on inkjet printhead die 110. In some embodiments, all nozzles on inkjet printhead die 110 can be the same size, rather than having multiple sized nozzles on inkjet printhead die 110.

The drop forming mechanisms associated with the nozzles are not shown in FIG. 1. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on a recording medium 20 (also sometimes called paper, print medium or medium herein).

Figure 2:
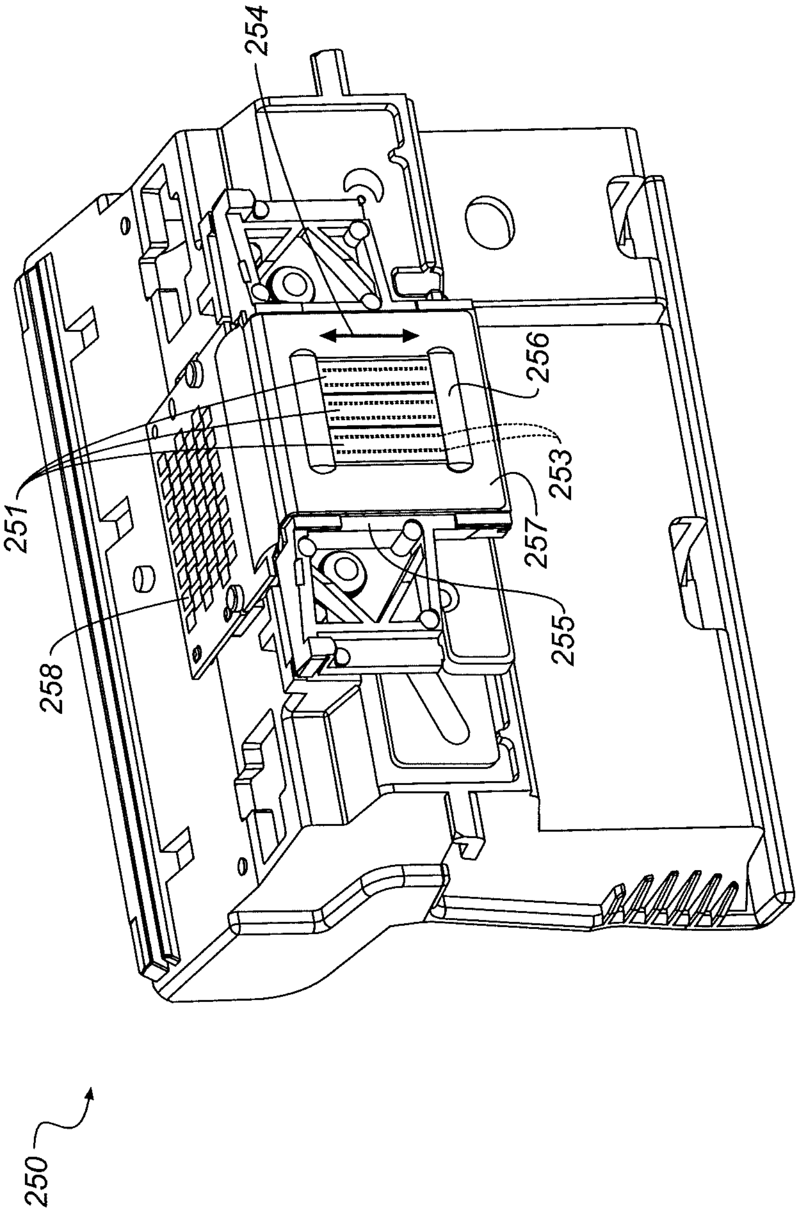
FIG. 2 is a perspective view of a printhead chassis of the printer of the present invention.

FIG. 2 shows a perspective view of a portion of a printhead chassis 250, which is an example of an inkjet printhead 100. Printhead chassis 250 includes three printhead die 251 (similar to inkjet printhead die 110 of FIGS. 1 and 2) that are affixed to a common mounting support member 255. Each printhead die 251 contains two nozzle arrays 253, so that printhead chassis 250 contains six nozzle arrays 253 altogether. The six nozzle arrays 253 in this example can each be connected to separate ink sources. Each of the six nozzle arrays 253 is disposed along nozzle array direction 254, and the length of each nozzle array along nozzle array direction 254 is typically on the order of 1 inch or less. Typical lengths of recording media are 6 inches for photographic prints (4 inches by 6 inches) or 11 inches for paper (8.5 by 11 inches). Thus, in order to print a full image, a number of swaths are successively printed while moving printhead chassis 250 across the recording medium 20. Following the printing of a swath, the recording medium 20 is advanced along a media advance direction that is substantially parallel to nozzle array direction 254.

Also shown in FIG. 2 is a flex circuit 257 to which the printhead die 251 are electrically interconnected, for example, by wire bonding or TAB bonding. The interconnections are covered by an encapsulant 256 to protect them. Flex circuit 257 bends around the side of printhead chassis 250 and connects to connector board 258. When printhead chassis 250 is mounted into the carriage 200 (see FIG. 3), connector board 258 is electrically connected to a connector (not shown) on the carriage 200, so that electrical signals can be transmitted to the printhead die 251.

Figure 3:
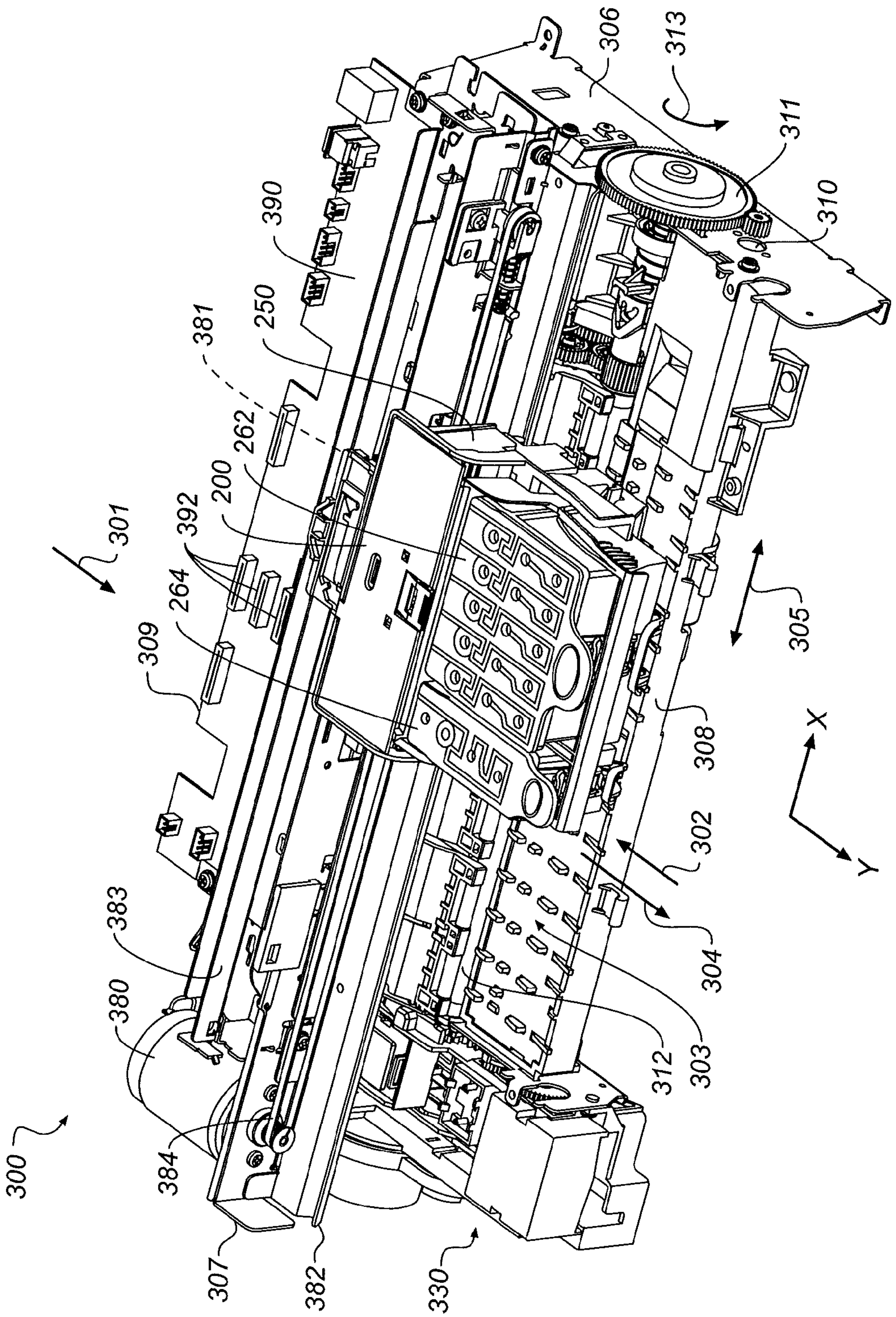
FIG. 3 is a perspective view of a carriage of the present invention.

FIG. 3 shows a portion of a desktop carriage printer. Some of the parts of the printer have been hidden in the view shown in FIG. 3 so that other parts can be more clearly seen. Printer chassis 300 has a print region 303 across which carriage 200 is moved back and forth in carriage scan direction 305 along the X axis, between the right side 306 and the left side 307 of printer chassis 300, while drops are ejected from printhead die 251 (not shown in FIG. 3) on printhead chassis 250 that is mounted on carriage 200. Carriage motor 380 moves belt 384 to move carriage 200 along carriage guide rail 382. An encoder sensor 381 is mounted on carriage 200 and indicates carriage location relative to an encoder fence 383. In other words, during times when the carriage 200 is moving in the carriage scan direction 305 and the recording medium is not moving, the relative position of the carriage 200 and the recording medium is directly monitored. Likewise, the position of components affixed to carriage 200 (including the light sensor 425 described below) relative to the recording medium are also directly monitored by use of encoder sensor 381 and encoder fence 383 when the recording medium is not moving.

Printhead chassis 250 is mounted in carriage 200, and multi-chamber ink supply 262 and single-chamber ink supply 264 are mounted in the printhead chassis 250. The mounting orientation of printhead chassis 250 is rotated relative to the view in FIG. 2, so that the printhead die 251 are located at the bottom side of printhead chassis 250, the droplets of ink being ejected downward onto the recording medium in print region 303 in the view of FIG. 3. Multi-chamber ink supply 262, for example, contains five ink sources: a clear protective fluid as well as black, cyan, magenta, and yellow ink; while single-chamber ink supply 264 contains the ink source for black text. For a C-shaped paper path, paper or other recording medium is loaded along paper load entry direction 302 toward the front of printer chassis 308. In a C-shaped paper path, the print media is loaded into a paper with the backside (i.e. the non-printing side) of the media facing outward, so that sensing of a bar code on the backside using reflected light is straightforward. In an L-shaped paper (discussed below), the paper would be loaded nearly vertically at the rear 309 of the printer chassis along paper load entry direction 301.

The print region 303 is defined as the region along the pathway of the carriage 200 as it moves printhead 250 in its carriage scan direction 305. In many printers, particularly those that are configured to print borderless prints of photographic images, for example, absorbent material 400 spans a predetermined length of the printer chassis 300 (see FIGS. 4 and 8 for clarity). The absorbent material 400 functions as a collector for absorbing superfluous ink mist or oversprayed ink present in the print region 303. A media support, which can include support ribs or pins 405, protrudes through the absorbent material 400 for providing a surface on which the paper rests during printing and during scanning of the paper type. As defined herein, "media support" means a support mechanism which functions primarily or entirely to support a print medium, such as paper and the like, during a stage of printing. The pins 405 are preferably disposed in a plurality of rows at predetermined locations relative to standard widths of print media, so that during borderless printing, ink that is oversprayed beyond the edges of the print medium lands primarily on absorbent material 400, rather than on the pins 405.

Figure 4:
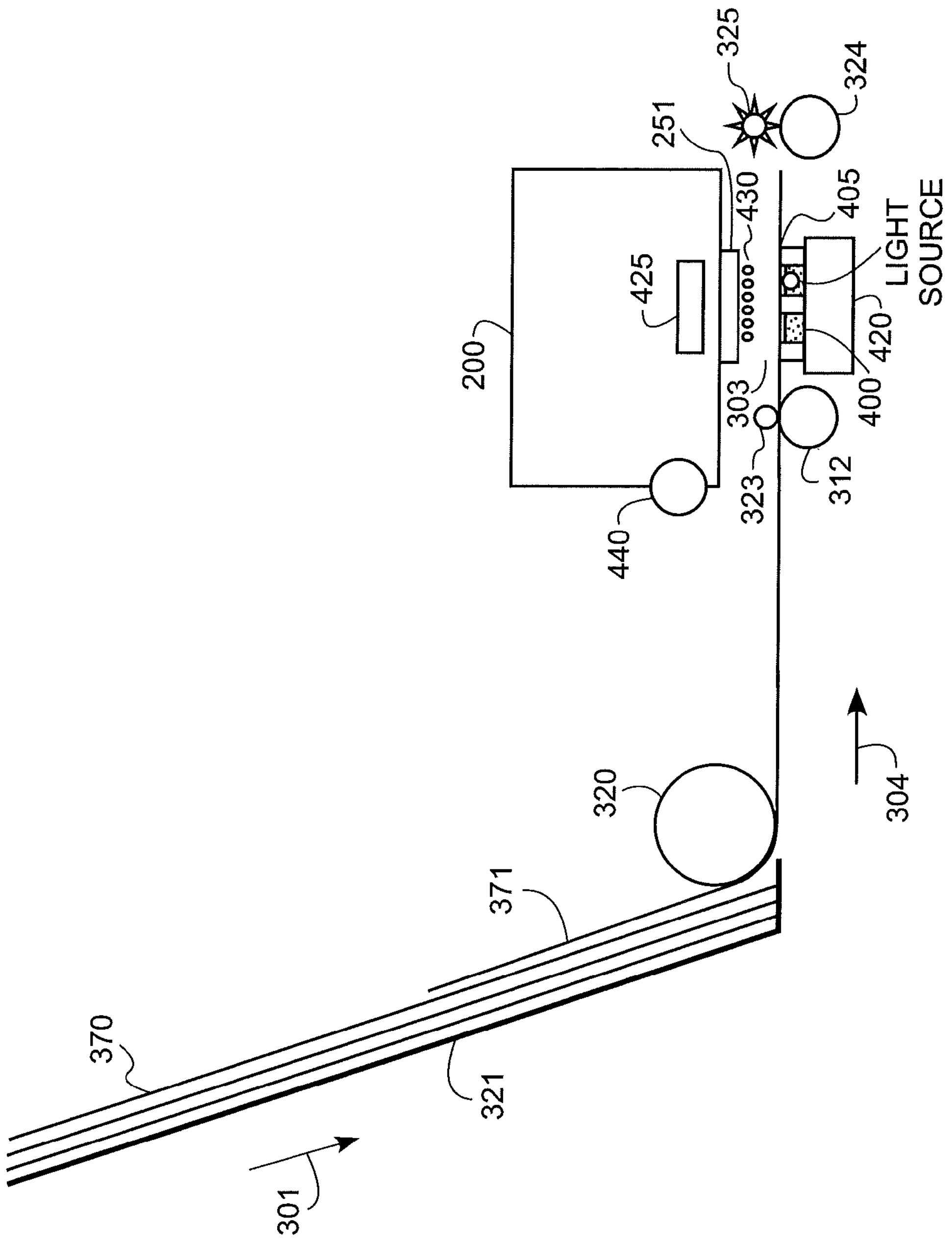
FIG. 4 is a block diagram illustrating the flow of the print media through the printing process of the L-shaped paper path of the present invention.

A variety of rollers are used to advance the medium through the printer as shown schematically in the side view of the L-shaped paper path of FIG. 4. In this example, a pick-up roller 320 moves the first piece or sheet 371 of a stack 370 of paper or other recording medium in media input support 321 from paper load entry direction 301 to the direction of arrow, media advance direction 304. The paper is then moved by feed roller 312 and idler roller(s) 323 to advance along the print region 303, and from there to a discharge roller 324 and star wheel(s) 325 so that printed paper exits along media advance direction 302. Feed roller 312 includes a feed roller shaft along its axis, and feed roller gear 311 (see FIG. 3) is mounted on the feed roller shaft. Feed roller 312 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller, which indirectly indicates the position of the sheet 371 of media as it is being advanced. The position of sheet 371 from the reading of the rotary encoder, assuming a nominal diameter of the roller, and assuming that the sheet moves without slippage relative to the roller. These assumptions are approximate, but not strictly accurate. Furthermore, while sheet 371 is being advanced by the pick-up roller 320, before sheet 371 reaches feed roller 312, it can be even more susceptible to slippage. For prior art media type identification systems that sense a bar code during the period of time when the sheet 371 is being advanced by the pick roller 320, measured distances between bar code features can sometimes be in error.

The motor that powers the paper advance rollers is not shown in FIG. 3, but the hole 310 at the right side of the printer chassis 306 is where the motor gear (not shown) protrudes through in order to engage feed roller gear 311, as well as the gear for the discharge roller (not shown). A drive train or belt, for example, can be provided between feed roller gear 311 and pick-up roller 320 to drive pick-up roller 320 when needed. For normal paper pick-up and feeding, it is desired that the feed roller 321 and discharge roller 324 rotate in forward rotation direction 313. Toward the left side of the printer chassis 307, in the example of FIG. 3, is the maintenance station 330.

Toward the rear of the printer chassis 309, in this example, is located the electronics board 390, which includes cable connectors 392 for communicating via cables (not shown) to the printhead carriage 200 and from there to the printhead chassis 250. Also on the electronics board are typically mounted motor controllers for the carriage motor 380 and for the paper advance motor, a processor and/or other control electronics (shown schematically as controller 14, memory 21 and image processing unit 15 in FIG. 1) for controlling the printing process, and an optional connector for a cable to a host computer.

Referring to FIG. 4, a platen 420 forms a foundation in which the absorbent material 400 is disposed. It is noted that the paper path is L-shaped or substantially L-shaped as opposed to a C-shaped paper path. Light source(s) 410 are disposed proximate the absorbent material 400 for illuminating the piece of media 371 as it passes below carriage 200. When the media 371 is below carriage 200, the light passes through the piece of media 371 and into a light sensor 425, which is attached to the carriage 200, for sensing the light transmitted through the piece of media 371. A media identification code, such as a bar code or the like, is disposed on the non-print side of the media 371 (the surface facing the light source) so that the media 371 can be identified via the transmitted light which is sensed by the sensor 425. During printing, the carriage 200 traverses back and forth across the printing zone 303 via a carriage guide rod 440 to position printhead die 251 to eject the ink drops 430 for printing onto the printing surface (surface facing the carriage 200) of the media 371 at precise locations determined by the image data and the position of the carriage determined from the encoder signals from encoder fence 383 (see FIG. 3). During a prior step of media identification, the carriage 200 is guided by carriage guide rod 440 to permit the sensor 425 to sense the transmitted light including the bar code pattern, while the relative position of the sensor 425 (being mounted on the carriage 200), is directly monitored by encoder sensor 381 and encoder fence 383, as described above relative to FIG. 3. In this manner, the printer is able to identify the particular type of media being used so that it may make any adjustments suitable for that particular media prior to printing. It is noted that, while some embodiments use a device such as a discrete photosensor as the sensing mechanism, other apparatuses may be used, such as a one-dimensional or two-dimensional image sensor array (CMOS or CCD) configured to capture the bar code, or a miniature camera in which the sensor and incremental, additional circuitry is added in order to make the sensor more functional as those skilled in the art will be able to implement.

In some embodiments, the carriage-mounted sensor 425 that is used to sense light transmitted through the sheet of media 371 for the purpose of identifying the type of media can also be used for other functions as well. US Patent Application Publication 2009/0213165, incorporated herein by reference, discloses a carriage-mounted sensor that can be used for functions including detecting malfunctioning ink jet nozzles, measuring printhead alignment, and characterizing media surface reflections. Such a carriage-mounted sensor can also be used as sensor 425 to sense light transmitted through the sheet of media 371 for the purpose of identifying the type of media. By using a single sensor for multiple functions in a printing system, cost savings can be realized.

Figure 5A:
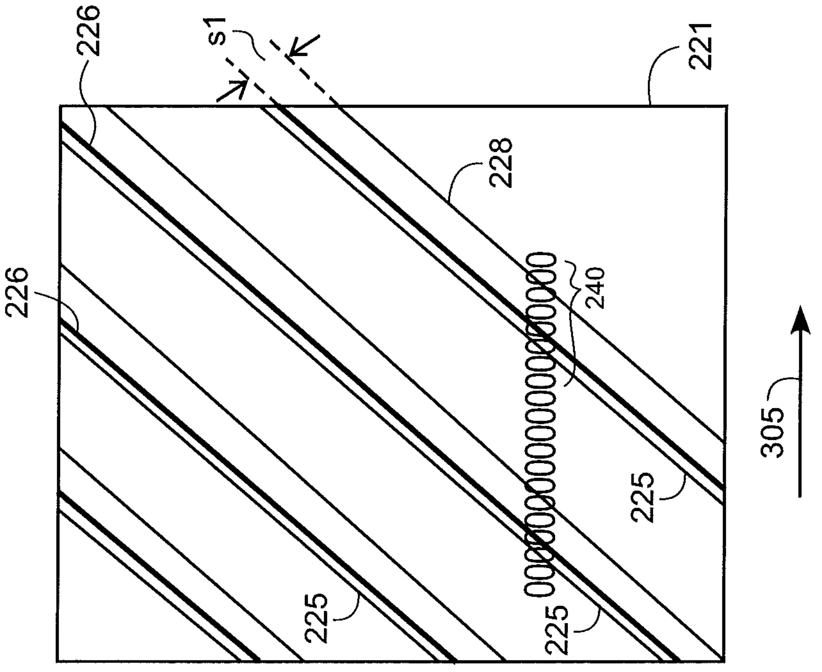
FIGS. 5A and 5B illustrate two different types of print media with correspondingly different bar codes.
Figure 5B:
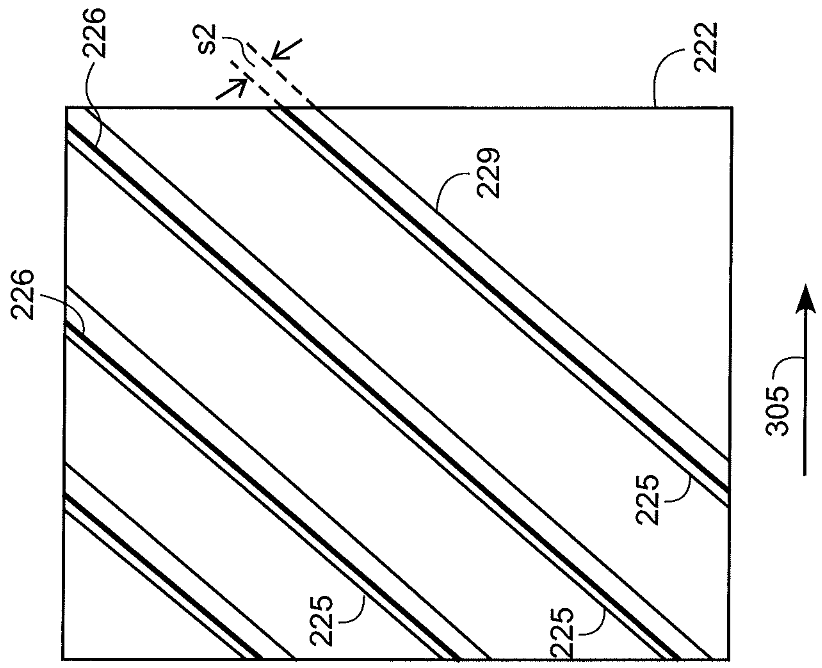

FIGS. 5A and 5B show schematic representation of markings on the backside of a first type of recording medium and a second type of recording medium respectively. In this embodiment, each of the various types of recording media has a reference marking consisting of a pair of “anchor bars” 225 and 226 which are located at a fixed distance with respect to one another for all media types. In addition, there is a first identification mark 228 on the first media type 221 in FIG. 5A, and there is a second identification mark 229 on the second media type 222 in FIG. 5B. In this example, first identification mark 228 is spaced a distance s1 away from anchor bar 226 on first media type 221, and second identification mark 229 is spaced a distance s2 away from anchor bar 226 on second media type 229, such that s1 does not equal s2. Thus in this example, it is the spacing of the identification mark from one of the anchor bars that identifies the particular type of recording medium.

Successive fields of view 240 of sensor 425, as carriage 200 is scanned relative to media type 221 along carriage scan direction 305, are schematically represented as ovals. Because the field of view 240 of the photosensor 425 moves along the carriage scan direction 305 as the carriage 200 moves, it is actually the projections of marking spacings s1 and s2 along carriage scan direction 305 that are measured. The actual field of view 240 of sensor 425 can be a different size or shape than the ovals shown in FIG. 5A, as determined, for example by aperture shape, the angle of the aperture plane relative to the plane of the recording medium, optical elements such as lenses, and optical path lengths. Photosensor data is actually sampled much more frequently than the ovals representing field of view 240 in FIG. 5A show, but only a few samples are shown for clarity.

The photosensor output signal can be amplified and filtered to reduce background noise and then digitized in an analog to digital converter. Once the amplified photosensor signal has been digitized, digital signal processing can be used to further enhance the signal relative to high frequency background noise. In addition, the time-varying signal can be converted into spatial distances to find peak widths or distances between peaks corresponding to the code pattern markings. Processed signal patterns are sent to a processor (for example a processor in controller 14 of FIG. 1) and compared to signal patterns stored in memory 21 to indicate media type.

In the examples shown in FIGS. 5A and 5B, the bar codes extend across the recording medium and are repeated a plurality of times on the recording medium. This configuration can be advantageous for the manufacturer of the recording medium in that recording media is typically manufactured in large rolls that are subsequently cut to size. If the bar code extends as in FIGS. 5A and 5B it can be applied while the recording medium is still in the large roll format, and cut to whatever size is required. Smaller bar codes that are positioned with respect to a particular edge or corner of the recording medium are not as easily provided.

Figure 6:
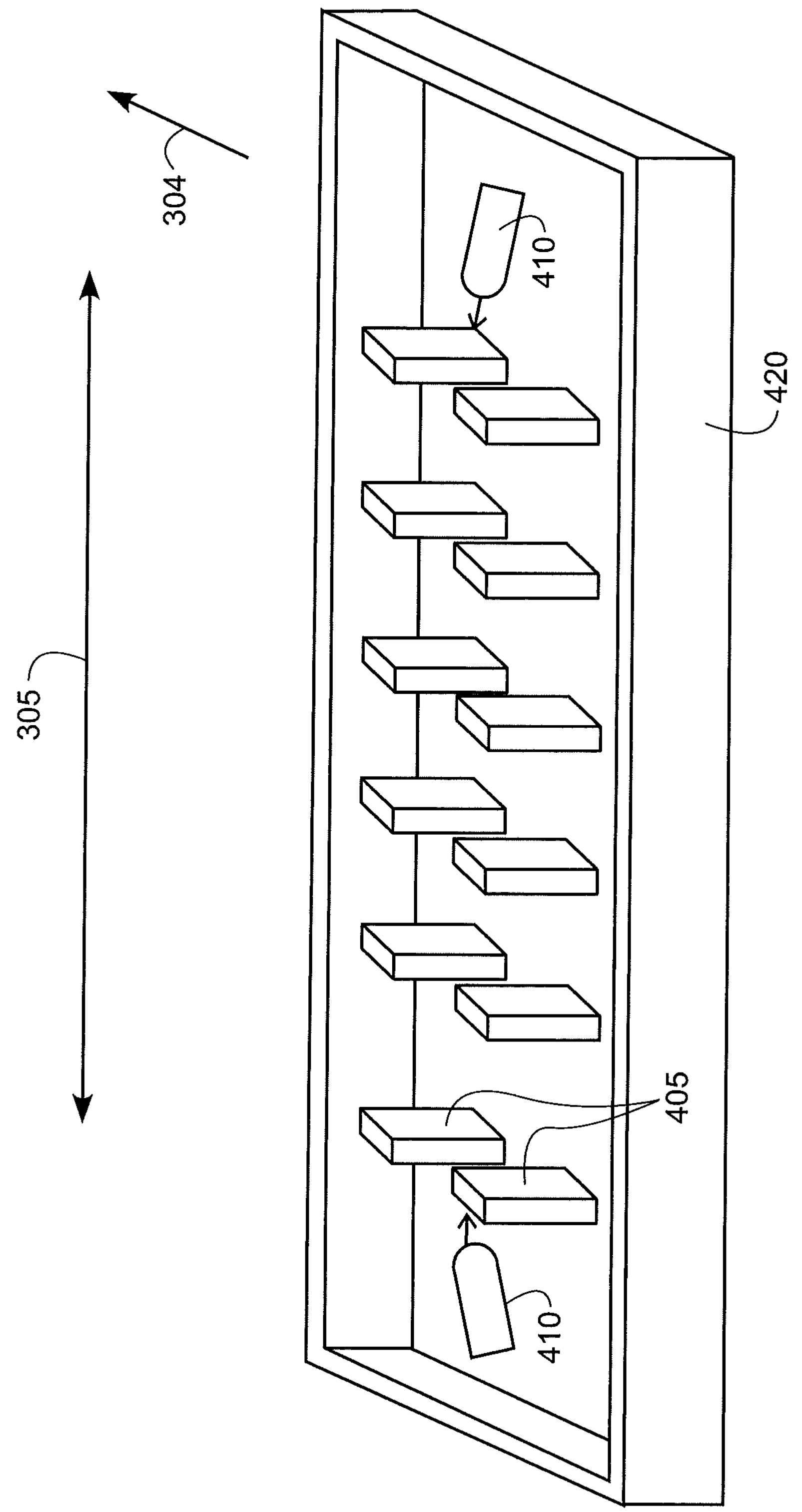
FIG. 6 is a perspective view of the platen of the printer of the present invention having light sources at each end of the platen.

It can be appreciated from the field of view ovals 240 in FIG. 5A, that it is preferable that the transmitted light from light source(s) 410 (see FIG. 4) extend across a relatively large region of one to two inches or more along direction that is substantially parallel to carriage scan direction 305. One alternative would be to use a relatively large light source 410 having a field of illumination extending along carriage scan direction 305. In other embodiments, a smaller light source 410, such as an infrared light emitting diode, can be oriented at a shallow angle relative to the media support to provide a sufficiently large field of illumination on the media that rests on the media support. A smaller light source 410 can be advantageous in that it can be compactly fit into the platen 420, as shown in FIG. 6. Because the light from a small light source falls off in intensity as it spreads out further from the light source, it can be advantageous to have two light sources 410 substantially facing one another (though inclined upwardly toward the media support surface) in order to provide a substantially uniform illumination in the region of interest, as is discussed further below.

Figure 7:
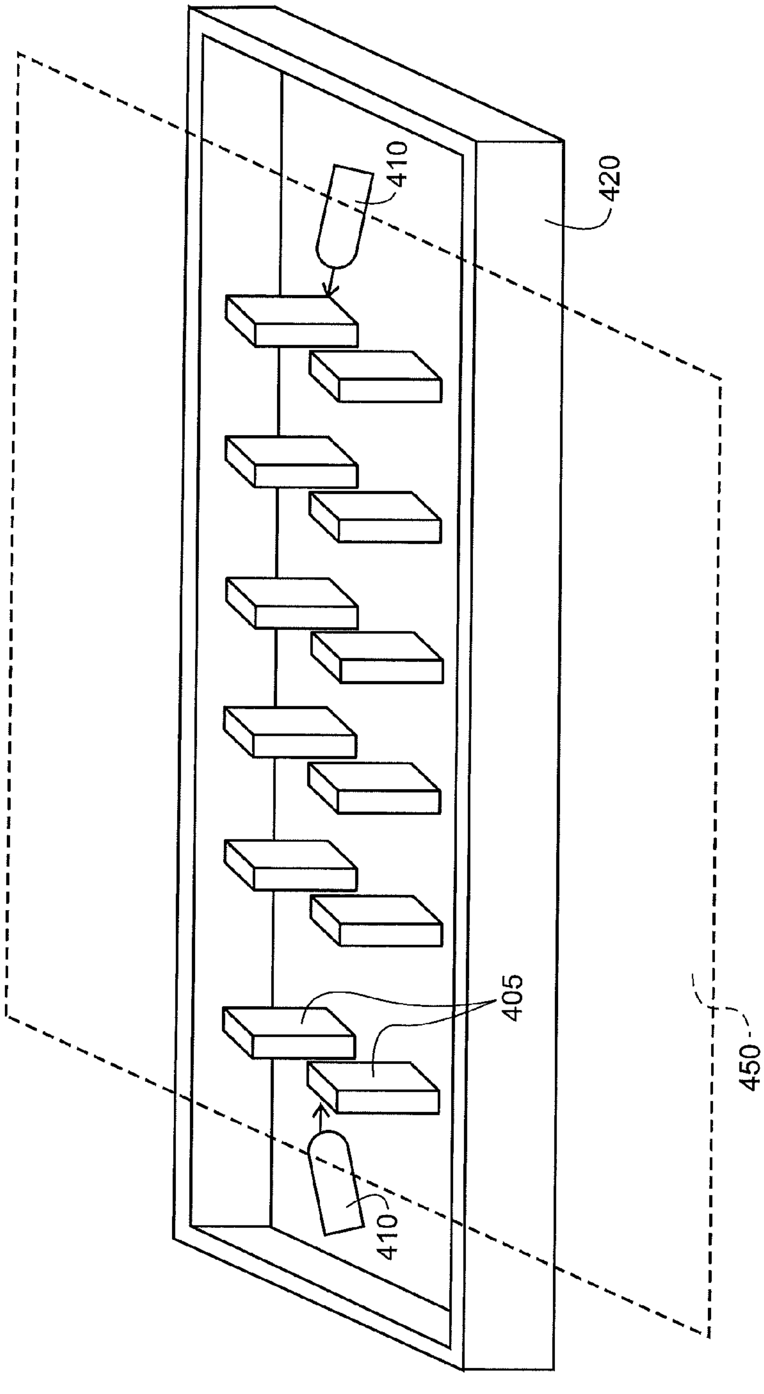
FIG. 7 illustrates the plane defined by the media support of the platen.

Referring to FIG. 6, there is shown a perspective view of the platen 420 with the absorbent material 400 removed for clarity. It is noted that the light sources 410 are disposed toward opposite ends of the platen 420 and are facing each other. Both light sources 410 are positioned angled upwardly toward the media support surface defined by the top ends of the plurality of support pins 405. The support pins are arranged in a plurality of rows along carriage scan direction 305, and the light sources 410 are positioned between two adjacent rows. In addition, it is noted that the light sources 410 are recessed relative to top ends of the support pins 405 defining the surface for media support. As shown in FIG. 7, the support pins 405 collectively define a plane 450 (identified by the dashed lines) onto which the media 371 rests when it is in the printing zone 303 for printing. (Although the media support surface is a plane 450 in this embodiment, it can be appreciated that in other embodiments the media support surface can be curved.) Furthermore and of significant importance to the present invention, the media 370, 371 will be scanned for identifying its media type when it is in the printing zone 303 below carriage 200, as described hereinabove.

Figure 8:
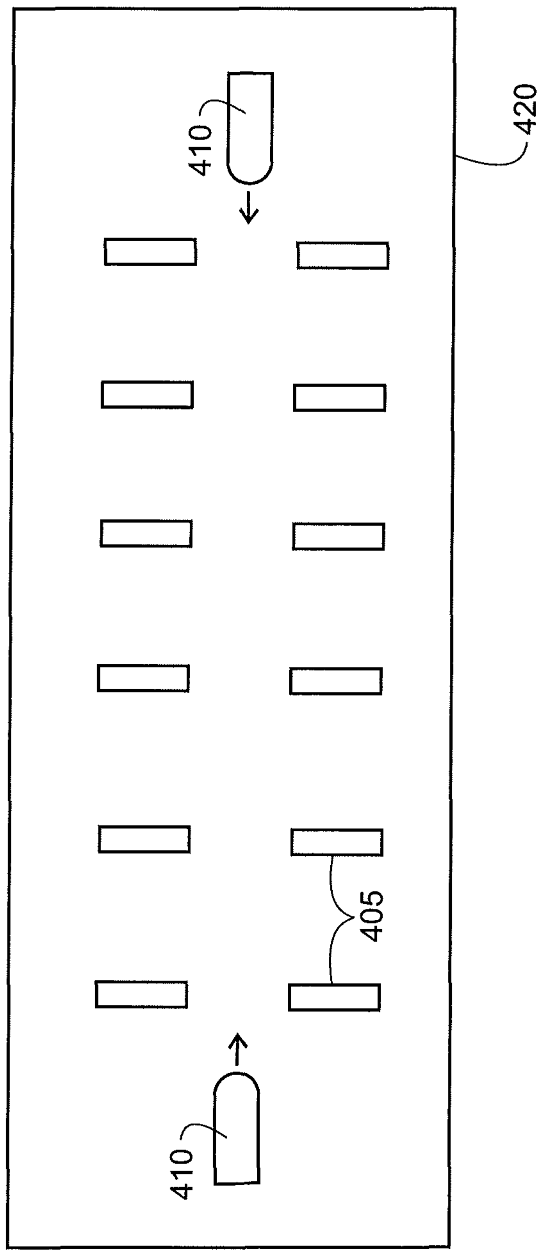
FIG. 8 is a diagram illustrating the projection of light from two light sources toward each other.
Figure 9:
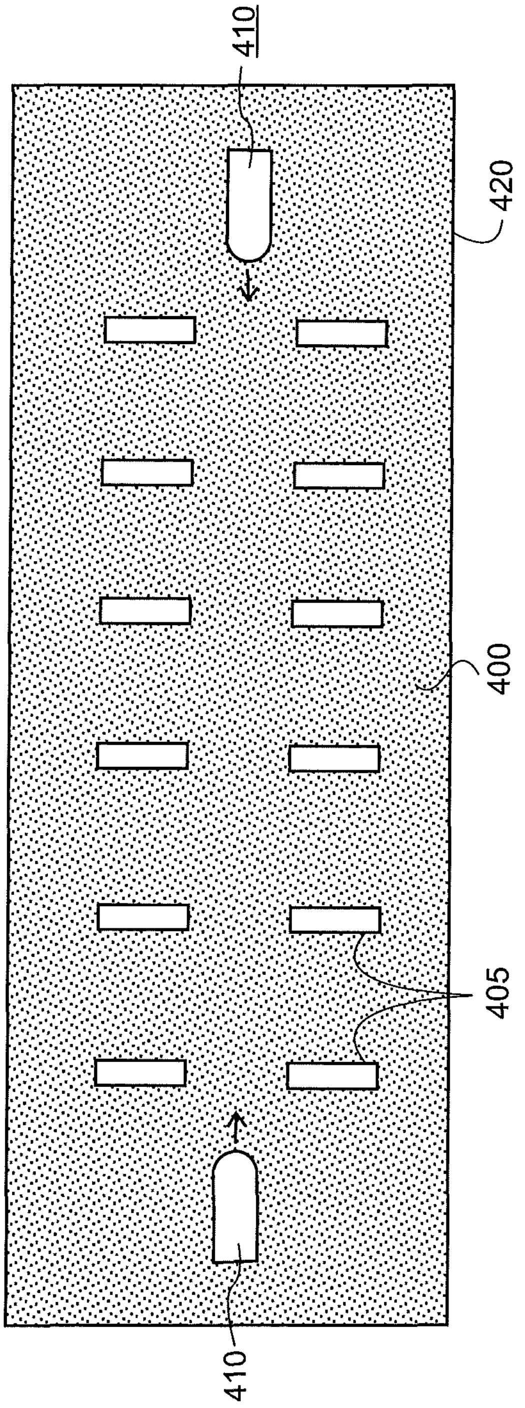
FIG. 9 is a diagram of FIG. 8 illustrating the absorbent material.

Referring to FIG. 8, there is shown a top view of the platen 420 with the absorbent material 400 again removed for clarity. The light sources 410 are positioned so its light, when illuminated, is not substantially obstructed by the support pins 405 as those skilled in the art will readily be able to implement. This is obviously important since the light functions to illuminate the identification code on the media 371. The light sources 410 are preferably spaced at least one inch apart, and in some embodiments at least two inches apart. Spacing of the light sources is related to the extent of the bar code region that is required for illumination, as can be seen in FIG. 5A. Closer spacing is advantageous for providing a greater light intensity for transmission through the media, but the field illumination should be sufficiently large to illuminate the bar code region, regardless of its placement on media 370. Referring to the top view shown in FIG. 9, there is shown the absorbent material 400 disposed in the platen 420, yet the light from light sources 410 is still unobstructed by the absorbent material 400 as can be implemented by those skilled in the art.

Figure 10:
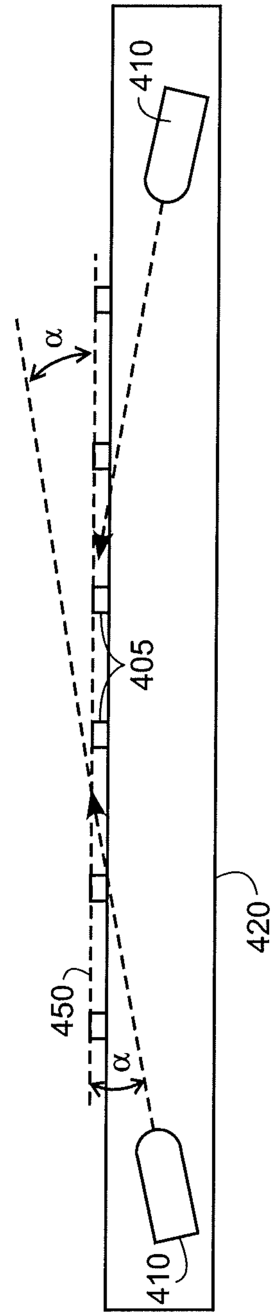
FIG. 10 is a side view of the platen illustrating the angles of projection of each of the light sources.
Figure 11:
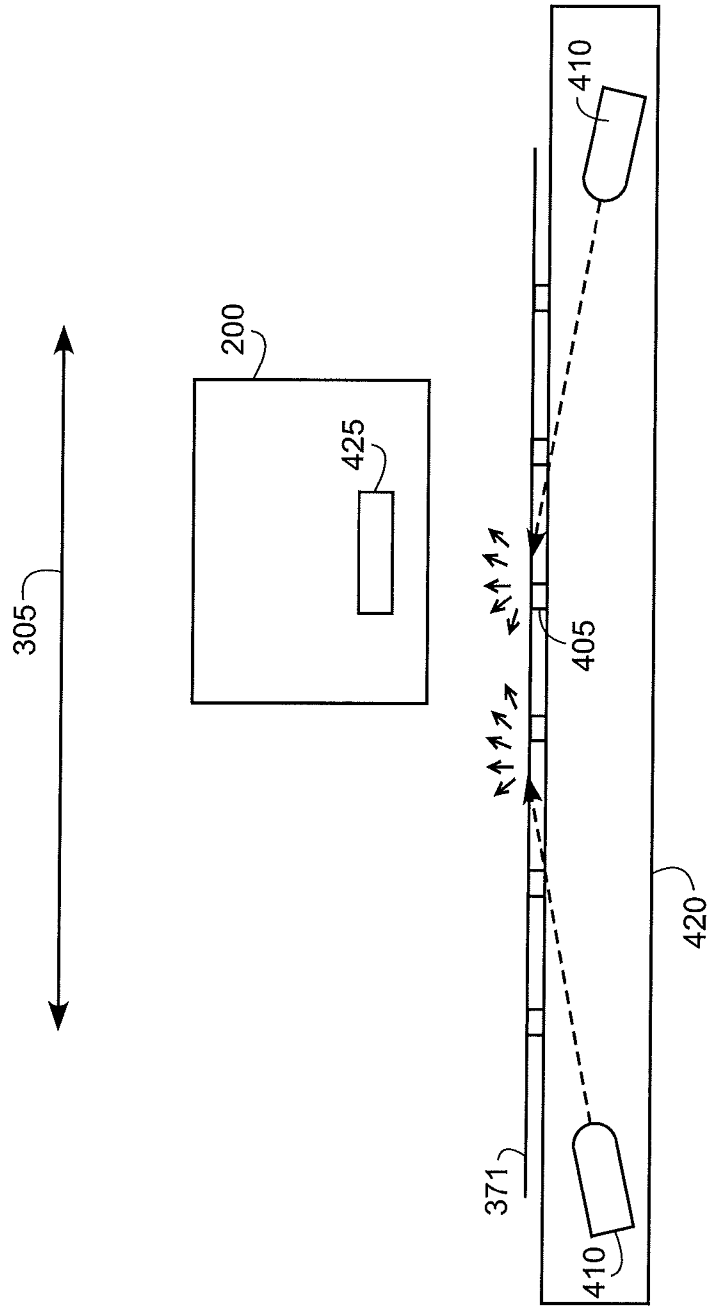
FIG. 11 is a side view of the platen illustrating the diffuse transmission of light through the media.

Referring to FIG. 10, there is shown a side view of the platen 420 having the light sources 410 angled upwardly toward the imaginary plane 450 corresponding to the media support surface defined by the top ends of support pins 405. It is noted that the orientation of each light source 410 forms an angle $\alpha$ with the defined plane 450. This angle $\alpha$ is preferably 45 degrees or less, and in some embodiments the angle $\alpha$ is preferably 20 degrees or less. Referring to FIG. 11, the piece of medium 371 is shown resting in the plane 450 defined by the support pins 405. Physically, as is readily apparent, the media 371 is supported by support points provided by the top ends of the support pins 405. It is noted that the light from both light sources 410 is scattered by media 371 so that the light is diffused as it passes through the media 371 (as represented by the clusters of small arrows) which facilitates the transmission of the bar code light pattern to the sensor 425. Carriage motion along carriage scan direction 305, in addition to its function during printing, facilitates the sensor 425 to sense the transmitted light having the bar code data since this movement spans the entire width or substantially the entire width of the media 371.

Figure 12:
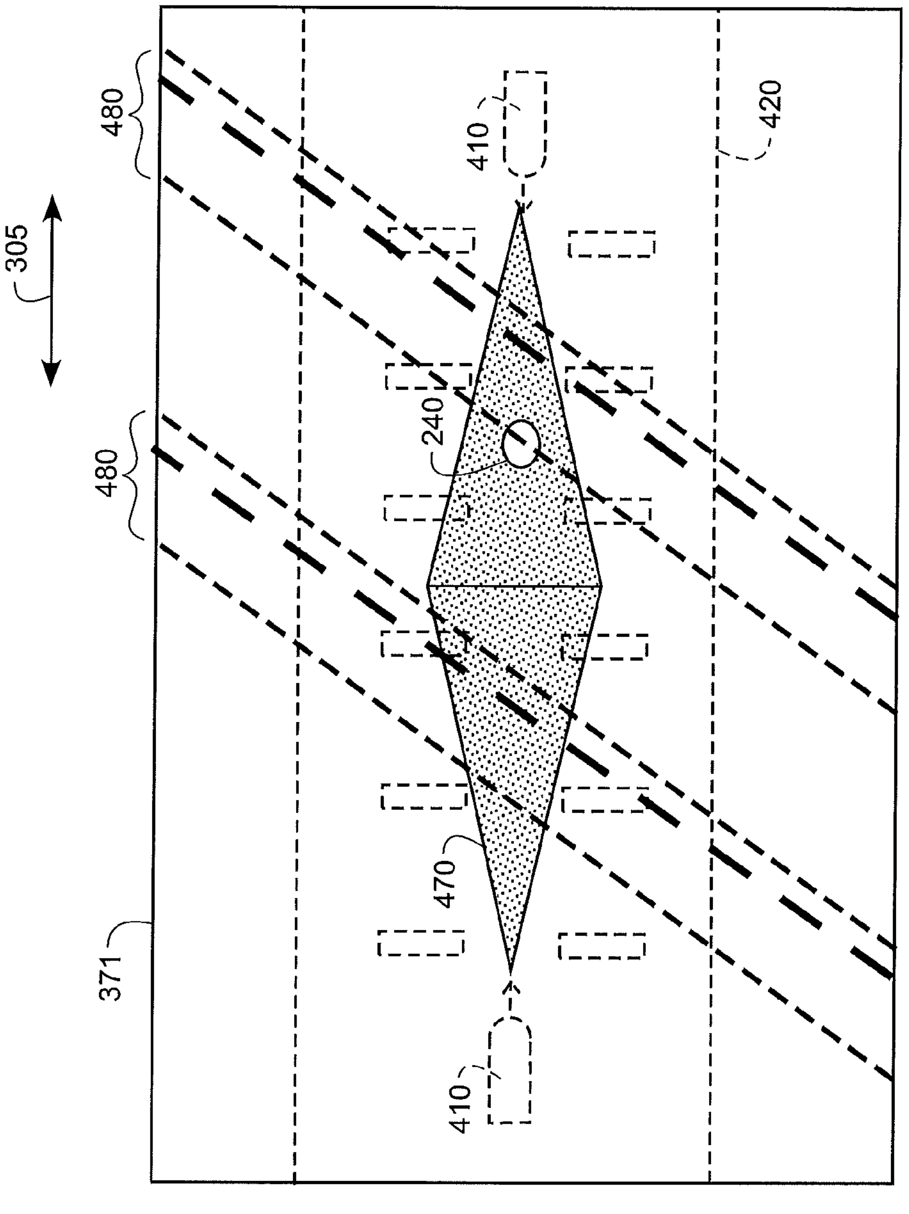
FIG. 12 is a top view of the print medium over the platen illustrating the combined light intensities of the light sources.

Referring to FIG. 12, the optics of the present invention is illustrated along with the bar code pattern 480 disposed on the non-printing surface of the media 371. It is noted that, as light leaves each light source 410 its individual intensity decreases further from the light source as the light spreads out, but since there are two light sources 410 directed substantially toward each other, the combined light intensities compensate for the decrease with distance. At points that are closer to a given light source 410, it may be apparent that the closer light source is supplying or primarily supplying the light intensity. It is of importance to the present embodiment of the invention to note that, given this configuration, the light intensity is uniform or substantially uniform in the diamond-shaped field of illumination 470 so that accuracy in sensing bar code signal pattern is improved as the field of view 240 of sensor 425 (not shown in FIG. 12) is moved along carriage scan direction 305. Of course, some light from light sources 410 extends beyond the diamond-shaped field of illumination 470 shown schematically in FIG. 12, but the field of view 240 remains in the substantially uniformly lit region.

After the light transmitted through piece of media 371 is received by sensor 425, the controller 14 compares signal patterns from the light sensor 425 to patterns stored in the memory 21 in order to identify the media type. In addition, a print mode may be selected based on the identified print medium type, and an image is processed according to the selected print mode. Finally, the image is printed.

Figure 13:
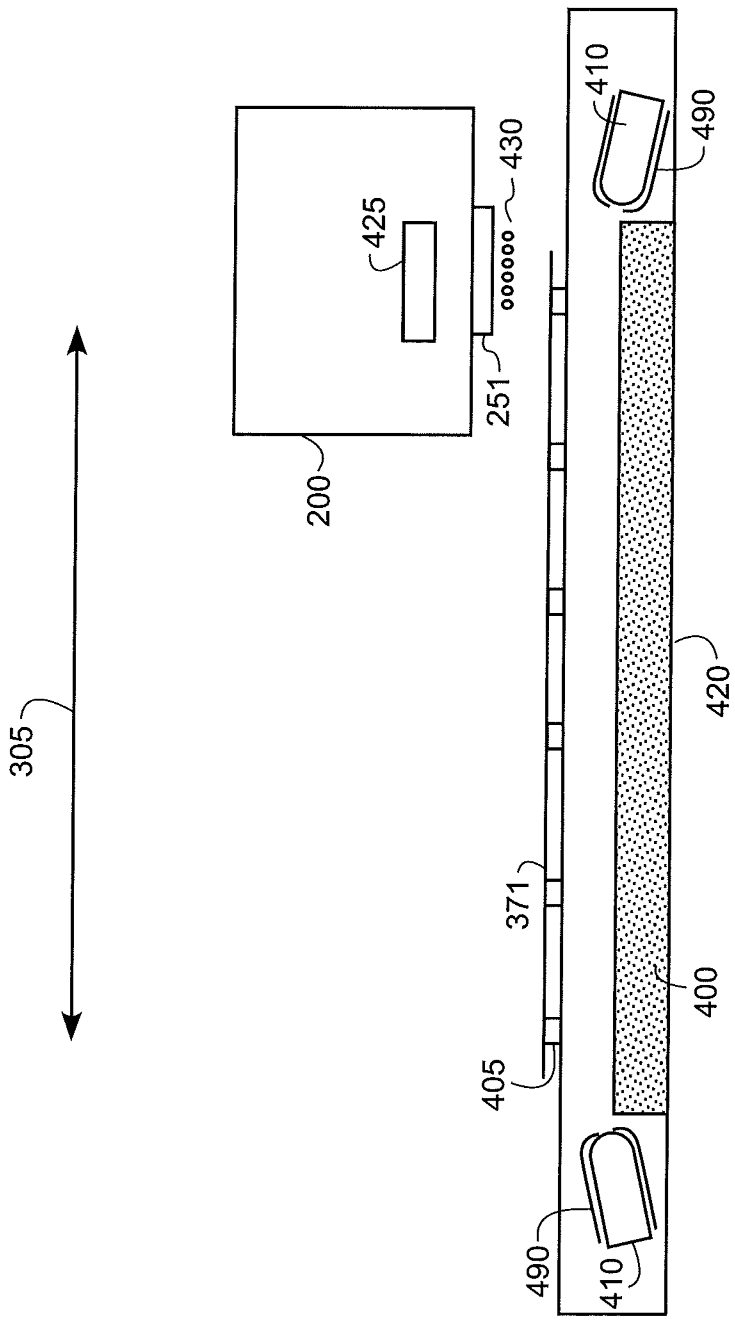
FIG. 13 is a side view of the platen illustrating a shroud covering the light sources for protective purposes.

Referring to FIG. 13, optionally, a shroud 490 can be conformingly placed around each light source 410 so that ink residue, such as ink mist and the like due to ejected ink drops 430 from printhead die 251, does not cover and/or obstruct the light sources 410 from efficiently providing light.

Figure 14:
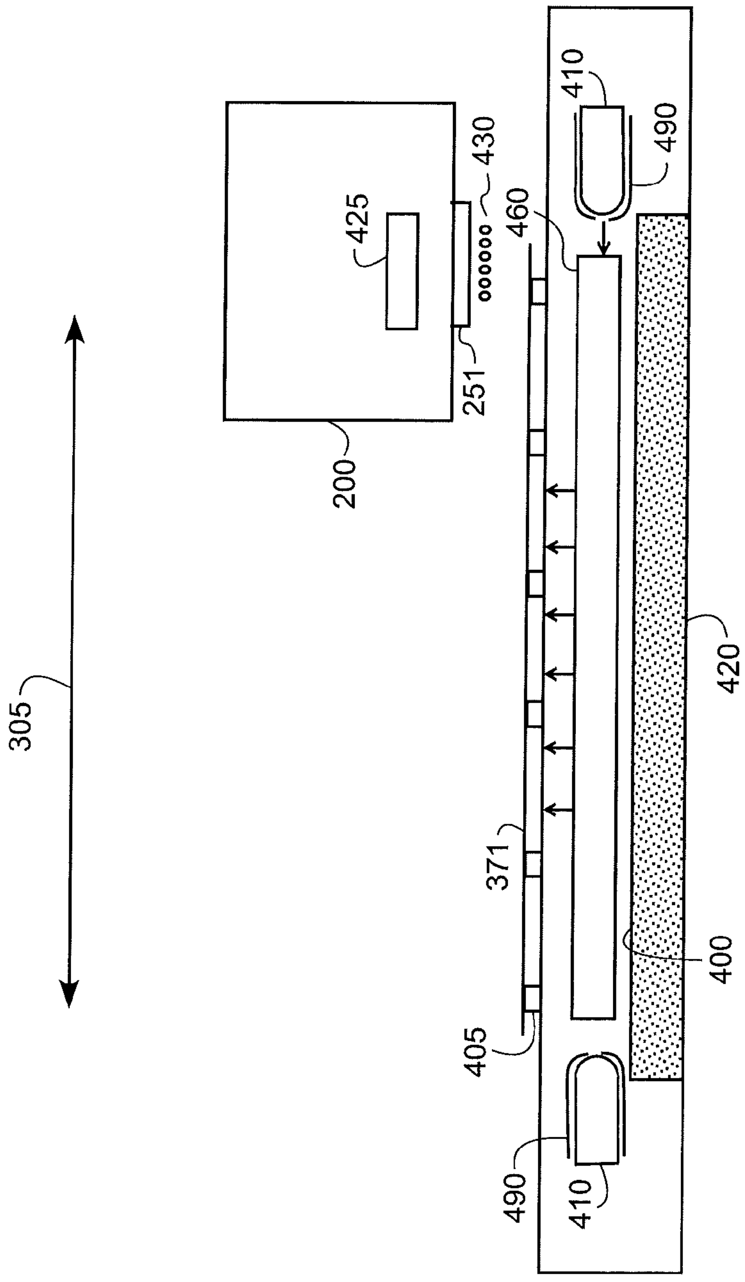
FIG. 14 is a side view of the platen illustrating a diffuser between the light source(s) and the media support surface.

Referring to FIG. 14, in some embodiments a diffuser 460 is located in the optical path between the light source(s) 410 and the media support surface (defined, for example by ends of support pins 405). Diffuser 460 can provide a more uniform field of illumination on sheet 371 of media that can be sensed by sensor 425 as it moves along carriage scan direction 305, rather than relying on sheet 371 itself to diffuse the light.

Figure 15:
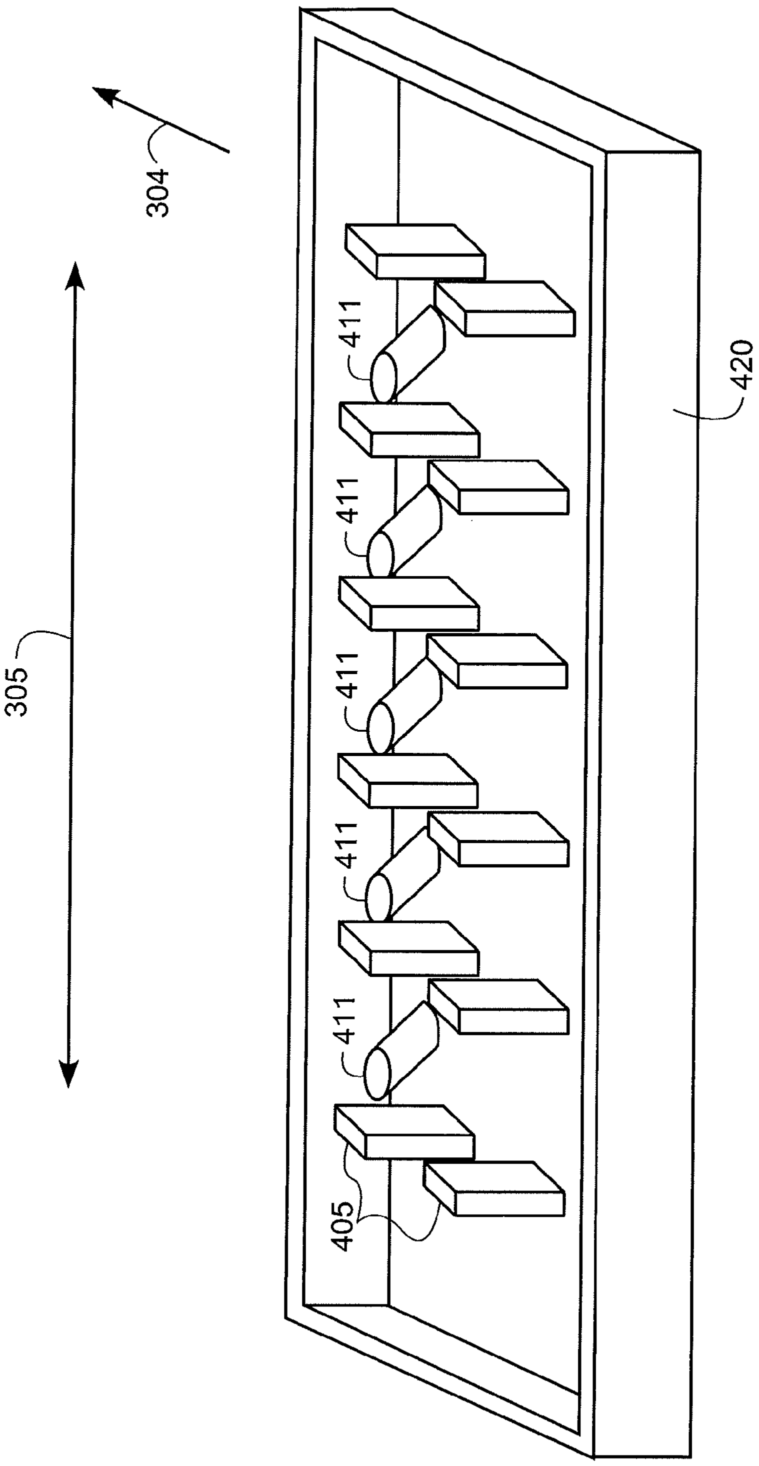
FIG. 15 is a perspective view of the platen and an array of light sources, according to an embodiment of the invention.
Figure 16:
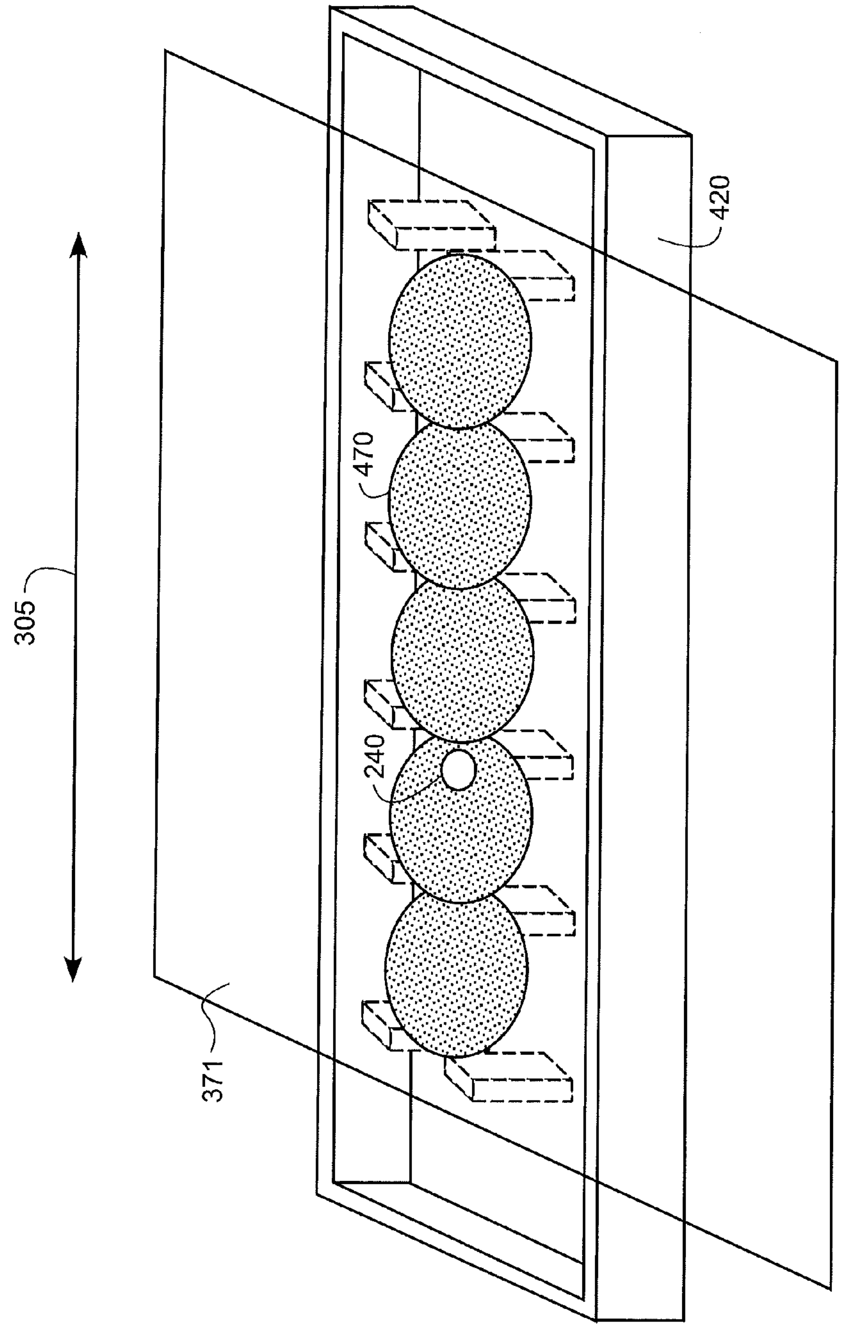
FIG. 16 is a perspective view illustrating the field of illumination from the array of light sources shown in FIG. 15.
Figure 17A:
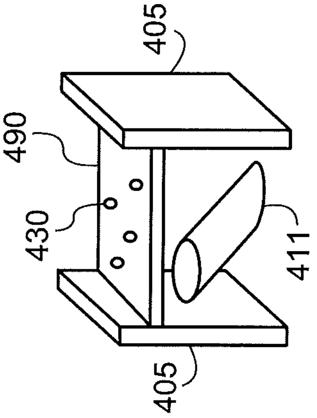
FIG. 17A is a perspective view of a shelf-like shroud that protects the light source from ink drops, but is positioned not to obstruct light.
Figure 17B:
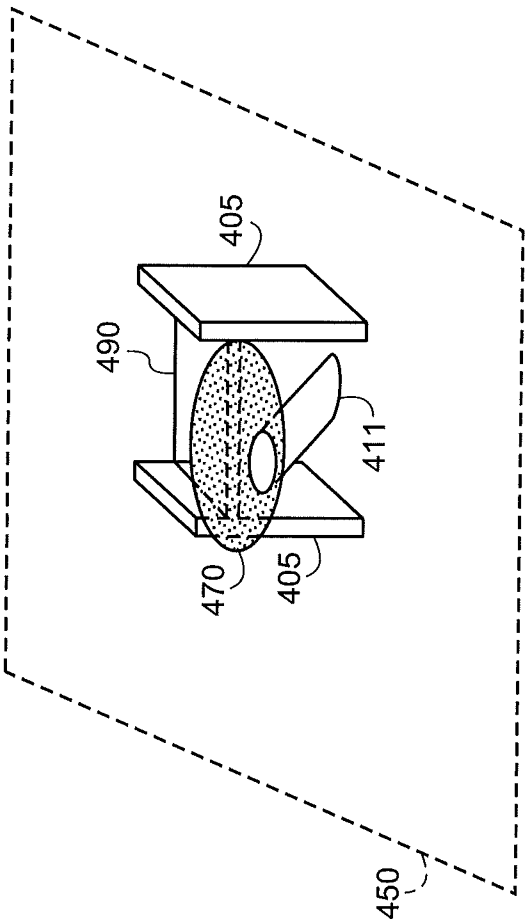
FIG. 17B is a perspective view showing the field of illumination from the light source of FIG. 17B.

Referring to FIGS. 15 and 16, in some embodiments, a substantially uniform field of illumination can be provided by an array of light emitting devices 411 that are arrayed substantially parallel to each other along the carriage scan direction 305 in platen 420 among support pins 405. Light emitting devices 411 are angled upward from platen 420, with a component of the orientation of the light emitting devices 411 being substantially perpendicular to the carriage scan direction (i.e. substantially parallel to the media advance direction). In this way, the illumination regions of adjacent light emitting devices 411 overlap at piece of medium 371, in order to provide a substantially uniform field of illumination 470 for transmissive illumination of piece of medium 371. Thus, field of view 240 of sensor 425 (not shown in FIG. 16) moves through a substantially uniform field of illumination 470 as carriage 200 is moved along carriage scan direction 305. An advantage of angling the light emitting devices 411 is that the light emitting devices 411 can be shielded from ink drops 430 resulting, for example, from overspray during borderless printing. In some embodiments (see FIG. 17A) shroud 490 can have the form of a shelf-like structure between two pins 405, such that the shelf-like shroud 490 is disposed over the light emitting devices 411, but the light from light emitting devices 411 is not obstructed by the shelf-like shroud 490 (see FIG. 17B). The shelf-like shroud 490 catches ink drops 430 or ink mist before they strike light source 410. The shelf-like shroud 490 is recessed relative to the tops of support pins 405 defining the media support surface, so that ink on the shelf-like shroud 490 is not transferred to the back of piece of medium 371.

In summary, the invention comprises a method for printing an image. The method comprises the steps of defining a media support surface, and advancing a print medium onto the support surface. Light is emitted from a first side of the print medium toward the defined surface, and a sensor moves on a second side of the print medium along a scan direction. The position of the sensor is monitored as it moves along the scan direction, and the light is sensed on the second side of the print medium which is opposite the first side as the light passes through the print medium to a sensor. Memory stores patterns representing particular media types, and a processor compares signals from the sensor to patterns stored in the memory in order to identify media type. The print medium is identified, and a print mode is selected based on the identified print medium type. The image is processed according to the selected print mode; and the image is printed on the print medium.

The invention has been described in detail with particular reference to certain preferred embodiments thereof, but it will be understood that variations and modifications can be effected within the spirit and scope of the invention.

PARTS LIST

10 Inkjet printer system
12 Image data source
14 Controller
15 Image processing unit
16 Electrical pulse source
18 First fluid source
19 Second fluid source
20 Recording medium
21 Memory
100 Inkjet printhead
110 Inkjet printhead die
111 Substrate
120 First nozzle array
121 Nozzle(s)
122 Ink delivery pathway (for first nozzle array)
130 Second nozzle array
131 Nozzle(s)
132 Ink delivery pathway (for second nozzle array)
181 Droplet(s) (ejected from first nozzle array)
182 Droplet(s) (ejected from second nozzle array)
200 Carriage
221 First type recording medium
222 Second type recording medium
225 First bar of anchor bar pair
226 Second bar of anchor bar pair
228 Identification mark for first type recording medium
229 Identification mark for second type recording medium
240 Field of view
250 Printhead chassis
251 Printhead die
253 Nozzle array
254 Nozzle array direction
255 Mounting support member
256 Encapsulant
257 Flex circuit
258 Connector board
262 Multi-chamber ink supply
264 Single-chamber ink supply
300 Printer chassis
301 Paper load entry direction (for L path)
302 Paper load entry direction (for C path)
303 Print region
304 Media advance direction
305 Carriage scan direction
306 Right side of printer chassis
307 Left side of printer chassis
308 Front of printer chassis
309 Rear of printer chassis
310 Hole (for paper advance motor drive gear)
311 Feed roller gear
312 Feed roller
313 Forward rotation direction (of feed roller)
320 Pick-up roller
321 Media input support
323 Idler roller
324 Discharge roller
325 Star wheel(s)
330 Maintenance station
370 Stack of media
371 First piece of medium
380 Carriage motor
381 Encoder sensor
382 Carriage guide rail
383 Encoder fence
384 Belt
390 Printer electronics board
392 Cable connectors
400 Absorbent material
405 Support pins
410 Light sources
411 Light emitting devices
420 Platen
425 Sensor
430 Ink drops
440 Carriage guide rod
450 Plane
460 Diffuser
470 Field of illumination
480 Bar code
490 Shroud

The invention claimed is:

1. A method for printing an image, the method comprising the steps of:

defining a media support surface;

advancing a print medium onto the media support surface;

creating a substantially uniform field of transmissive illumination of the print medium by emitting light from a first light source and a second light source that are disposed on a first side of the print medium, wherein the first light source and the second light source are separated from each other along a scan direction;

moving a field of view of a sensor on a second side of the print medium through the substantially uniform field of transmissive illumination as the sensor moves along the scan direction;

monitoring the position of the sensor as it moves along the scan direction;

sensing the light on the second side of the print medium which is opposite the first side while the sensor moves along the scan direction as the light passes through the print medium to the sensor;

providing memory for storing patterns representing particular media types;

providing a processor for comparing signals from the sensor to patterns stored in the memory in order to identify media type;

identifying the print medium type;

selecting a print mode based on the identified print medium type;

processing an image according to the selected print mode; and printing the image on the print medium.

2. The method as in claim 1, wherein the defined media support surface is formed by a plurality of support points.

3. The method as in claim 1, wherein the defined media support surface is a plane.

4. The method as in claim 1, further comprising the step of emitting infrared light from a light emitting diode as the first light source.

5. The method as in claim 4, wherein an angle of the emitted light to the print medium is 20 degrees or less.

6. The method as in claim 1, wherein the second light source is displaced a predetermined distance from the first light source.

7. The method as in claim 6, wherein the second light source includes an optical path which is 20 degrees or less from the defined surface.

8. The method as in claim 1, further comprising the step of providing an absorbent material disposed proximate the media support.

9. The method as in claim 1, further comprising the step of orienting the first light source and the second light source in substantially opposite directions to provide substantially uniform lighted region on the print medium.

10. The method as in claim 9, wherein the substantially uniform lighted region on the print medium extends along the scan direction by a distance of at least one inch.

11. The method as in claim 1, wherein an angle of the emitted light is 45 degrees or less from the print medium.

12. The method as in claim 1, wherein a portion of the print medium that is illuminated extends along the scan direction by a distance of at least one inch.

13. The method as in claim 1, wherein the first and second light source are stationary.

* * * * *